United States Patent
Orr

(10) Patent No.: US 9,630,396 B2
(45) Date of Patent: Apr. 25, 2017

(54) APPARATUS AND METHOD FOR PRINTING THREE DIMENSIONAL ARTICLES

(71) Applicant: Craig Orr, Seoul (KR)

(72) Inventor: Craig Orr, Seoul (KR)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 13/956,615

(22) Filed: Aug. 1, 2013

(65) Prior Publication Data
US 2013/0314460 A1 Nov. 28, 2013

Related U.S. Application Data

(62) Division of application No. 13/400,825, filed on Feb. 21, 2012, now abandoned, which is a division of
(Continued)

(51) Int. Cl.
*B41J 29/38* (2006.01)
*B41F 17/00* (2006.01)
(Continued)

(52) U.S. Cl.
CPC .......... *B41F 17/006* (2013.01); *B41J 3/4073* (2013.01); *B41M 5/0047* (2013.01); *B41M 5/0064* (2013.01); *B41M 5/0088* (2013.01)

(58) Field of Classification Search
USPC .................. 347/1–4, 8, 19; 53/411; 33/18.1
See application file for complete search history.

(56) References Cited

U.S. PATENT DOCUMENTS

| 3,744,032 A | 7/1973 | Engelberger et al. |
| 3,811,483 A | 5/1974 | Morrison |
| (Continued) | | |

FOREIGN PATENT DOCUMENTS

| EP | 0023471 A1 | 2/1981 |
| JP | 11165406 A | 6/1999 |
| (Continued) | | |

OTHER PUBLICATIONS

Japanese Patent No. 2001071285 (A); Publication Date: Mar. 21, 2001; Abstract Only; 2 Pages.
(Continued)

*Primary Examiner* — Lam Nguyen
(74) *Attorney, Agent, or Firm* — Cantor Colburn LLP

(57) ABSTRACT

An apparatus for printing an image onto a curved surface of a three dimensional article. The apparatus principally includes a support fixture, an ink jet print head having a plurality of nozzles, and an articulatable robotic arm. One of the support fixture and the print head are mounted to and carried by the robotic arm. The robotic arm is moveable so as to cause relative movement of the print head along a series of scanning paths that follow the surface contour of the curved surface of the article. A controller is coupled to the robotic arm and is configured to cause articulation of the robotic arm. The controller causes the robotic arm to continuously locate the print head relative to the curved surface and to cause the plurality of nozzles to eject printing medium at predetermined locations along the scanning paths so as to form the image.

20 Claims, 4 Drawing Sheets

Related U.S. Application Data application No. 12/346,093, filed on Dec. 30, 2008, now abandoned.

(60) Provisional application No. 61/018,178, filed on Dec. 31, 2007.

(51) Int. Cl.
*B41J 3/407* (2006.01)
*B41M 5/00* (2006.01)

(56) References Cited

U.S. PATENT DOCUMENTS

| | | |
|---|---|---|
| 4,291,642 A | 9/1981 | Kolc |
| 4,420,812 A | 12/1983 | Ito et al. |
| 4,463,359 A | 7/1984 | Ayata et al. |
| 4,605,569 A | 8/1986 | Shimada et al. |
| 4,692,351 A | 9/1987 | Maeda et al. |
| 4,762,578 A | 8/1988 | Burgin, Jr. et al. |
| 4,941,428 A | 7/1990 | Engel |
| 4,983,875 A | 1/1991 | Masaki et al. |
| 5,119,759 A | 6/1992 | Hicks |
| 5,339,103 A | 8/1994 | Schmidt et al. |
| 5,340,400 A | 8/1994 | Schmidt et al. |
| 5,558,716 A | 9/1996 | Mitani et al. |
| 5,618,347 A | 4/1997 | Clare et al. |
| 5,831,641 A | 11/1998 | Carlson |
| 6,008,473 A | 12/1999 | Gillner et al. |
| 6,360,656 B2 | 3/2002 | Kubo et al. |
| 6,689,219 B2 | 2/2004 | Birmingham |
| 7,360,853 B2 * | 4/2008 | Barss ................... 347/8 |
| 7,858,899 B2 | 12/2010 | Fujii et al. |
| 2001/0003871 A1 | 6/2001 | Patton et al. |
| 2001/0019340 A1 | 9/2001 | Kubo et al. |
| 2002/0071772 A1 | 6/2002 | Isogai et al. |
| 2003/0029336 A1 | 2/2003 | Thompson et al. |
| 2003/0084845 A1 | 5/2003 | Prentice et al. |
| 2003/0085934 A1 * | 5/2003 | Tucker .............. B41J 3/407 347/1 |
| 2004/0033369 A1 | 2/2004 | Fleming et al. |
| 2005/0056213 A1 | 3/2005 | Iimori et al. |
| 2007/0151966 A1 | 7/2007 | Schwenke et al. |
| 2007/0151996 A1 | 7/2007 | Myoji |
| 2007/0157559 A1 * | 7/2007 | Till .................... 53/411 |
| 2007/0175175 A1 | 8/2007 | Schwenke et al. |
| 2009/0167817 A1 | 7/2009 | Orr |
| 2010/0055299 A1 | 3/2010 | Church et al. |
| 2011/0262627 A1 | 10/2011 | Schwenke et al. |
| 2012/0196029 A1 | 8/2012 | Nelson |
| 2012/0200626 A1 | 8/2012 | Orr |

FOREIGN PATENT DOCUMENTS

| | | |
|---|---|---|
| JP | 2000006493 A | 1/2000 |
| JP | 2000238254 | 9/2000 |
| JP | 2000238254 A | 9/2000 |
| JP | 2001071285 | 3/2001 |
| JP | 2001071285 A | 3/2001 |
| JP | 2001328254 | 11/2001 |
| JP | 2001328254 A | 11/2001 |
| JP | 2002042585 A | 2/2002 |
| WO | 03011607 A1 | 2/2003 |
| WO | 2004016438 A1 | 2/2004 |
| WO | 2004082934 A1 | 9/2004 |
| WO | 2008052116 A2 | 5/2008 |

OTHER PUBLICATIONS

Japanese Patent No. 2001328254 (A); Publication Date: Nov. 27, 2001; Abstract Only; 2 Pages.
Japanese Patent No. 2002042585 (A); Publication Date: Feb. 8, 2002; Machine Translation; 6 Pages.
Written Opinion of the International Searching Authority; International Application No. PCT/US2008/088545; International Filing Date: Dec. 30, 2008; Date of Mailing; May 18, 2009; 6 Pages.
U.S. Appl. No. 13/355,684; "Apparatus and Method for Forming a Uniform Grid Line"; Filing Date: Jan. 23, 2012.
Japanese Patent No. 11165406 (A); Publication Date: Jun. 22, 1999; Abstract Only; 1 Page.
Japanese Patent No. 2000238254 (A); Publication No. 2000-09-05; Abstract Only; 1 Page.
International Preliminary Report on Patentability; International Application No. PCT/US2008/088545; International Filing Date: Dec. 30, 2008; Date of Mailing: Apr. 29, 2010; 10 Pages.
International Search Report; International Application No. PCT/US2008/088545; International Filing Date: Dec. 30, 2008; Date of Mailing; May 18, 2009; 6 Pages.
JPH10211458 A, Aug. 11, 1998, Abstract Only, 2 pages.
JPH05253523; English Abstract; Date of Publication: Oct. 5, 1993; 10 pages.
JPH06196743 English Abstract; Date of Publication: Jul. 15, 1994; 27 pages.
JPH0742163U English Abstract; Date of Publication: Jul. 21, 1995; 1 page.
JPS62241782 English Abstract; Date of Publication Oct. 22, 1987; 1 page.
JP2004017004 A; English Abstract; Date of Publication Jan. 22, 2004; 2 pages.
JP2005001131 A; English Abstract; Date of Publication Jan. 6, 2005; 2 pages.

* cited by examiner

APPARATUS AND METHOD FOR PRINTING THREE DIMENSIONAL ARTICLES

CROSS REFERENCE TO RELATED APPLICATION

The present application is a divisional of U.S. patent application Ser. No. 13/400,825, filed on Feb. 21, 2012, which is a divisional of U.S. patent application Ser. No. 12/346,093, filed on Dec. 30, 2008, entitled "APPARATUS AND METHOD FOR PRINTING THREE DIMENSIONAL ARTICLES", which claims the benefit of U.S. Provisional Application Ser. No. 61/018,178, filed on Dec. 31, 2007, entitled "INK JET PULSE GENERATION", the entire contents of all of the foregoing are incorporated herein by reference.

BACKGROUND

The present is invention generally relates to printing on a three-dimensional object. More specifically, this invention relates to an apparatus and method of printing a high quality image on a curved substrate utilizing a robotic system incorporating an ink jet printing head.

Molded plastic articles are becoming widely accepted as a replacement for metallic and glass articles. For example, panels of plastic materials, such as polycarbonate (PC) and polymethylmethyacrylate (PMMA), are currently being used to replace conventional glass windows and metal body panels in a variety of automotive applications, including components such as B-pillars, headlamps, windows, moon-roofs and sunroofs. Automotive window systems represent a particularly desirable application for these plastic materials due to their many identified advantages, particularly in the areas of styling1 design, weight savings, safety and security. More specifically, plastic materials offer the automotive manufacturer the ability to distinguish their vehicles by increasing overall design and shape complexity. Being lighter in weight than conventional glass window systems, the incorporation of plastic window systems and components into the vehicle may facilitate both a lower center of gravity for the vehicle (and therefore better vehicle handling & safety) and improved fuel economy. Further, enhanced safety is realized, particularly in a roll-over accident because of a greater probability of the occupant or passenger being retained in a vehicle. Another advantage associated with plastic window systems is the ability to integrate several components (previously bonded or joined together) into one article, thereby reducing the number of assembly operations.

One inherent problem that with plastic window systems is the inability to easily print a high quality image on the resulting complex surface shape (concave, convex, multiple curvature, etc.) of the article. Printing is desirable since other means for creating images on the surface of complex three-dimensional articles are time consuming. Unfortunately, common two-dimensional printing methods, such as screen-printing and pad-printing, have only been able to meet this need with limited success.

An image may be printed directly onto either surface of a two-dimensional article using an ink or paste and various methods known to those skilled in the art. In addition to the above mentioned methods, other methods include screen-printing, ink jet printing and automatic dispensing (such as drip & drag, streaming, and simple flow dispensing). In each of the above instances, the shape of the panel impacts the quality of the printed image, for example, screen printing and other methods become very difficult on non-planar panels. The speed at which printing is done also affects the quality of individually printed lines or features, and therefore the resultant image. Slower speeds and higher flow rates for the ink or paste can result in wider and thicker features of the image. Conversely, higher speeds and slower flow rates can result in slimmer and lower features. Further, maintaining an appropriate off-set distance between the printing device and the surface of the article becomes more difficult as complexity of the surface shape increases, but maintaining a proper off-set is necessary to ensure a high quality image. One additional concern is being able to easily adapt the printing system to different shaped articles, as opposed to having to construct, for each new article design, a new printing system which is dedicated to that specific article.

Accordingly, there exists a need to provide an improved apparatus and method for printing an image on the surface of a three-dimensional article or substrate, such as a plastic automotive window.

SUMMARY

In satisfying the above need, as well as overcoming the enumerated drawbacks and other limitations of the related art, the present invention generally provides an apparatus and method for printing an image onto the curved surface of a three-dimensional article, including, but not limited to, a plastic automotive window. The printing apparatus is a robotic system that includes a support fixture adapted to support the three-dimensional article. An articulatable arm is positioned relative the support fixture such that an end of the arm can be positioned opposite the curved surface of the article to be printed. Carried by and mounted to the end of the arm is an ink jet print head. In that the arm is moveable with more than three degrees of freedom, the arm is capable of positioning the ink jet print head at any orientation and location relative to the curved surface of the article. The ink jet print head includes a plurality of nozzles that are coupled to source of ink or other medium suitable for printing, and also includes the appropriate control structures for dispensing ink from the nozzles in accordance with commands from a controller or control system.

To produce an image, a waveform with a particular shape, amplitude and pulse duration must be applied individually to each jet within the print head at a precise point in time corresponding with a pixel location on the surface of the article. This controls the amount of ink ejected from the nozzle and, in part, the characteristics of the resulting pixel of ink on the article, and eventually the quality of the overall image. Conventional ink jet printing applications manipulate the location of the print head via movement with two degrees of freedom (x and y axes), and sometimes three (X, Y, and Z axes) relative to an object. With the present invention, more than three degrees of freedom (up to six) are utilized in positioning the print head relative to the curved surface of the article. These additional degrees of freedom include rotational movement about the three axes, namely A, B and C (sometimes referred to as Xr, Yr and Zr), so as to provide orientational positioning of the print head, in addition to the translational positioning provided by movement along the X, Y, and Z axes. In this manner, the orientation of the print head may be kept normal to the surface of the article at all times.

With the present invention, the arm moves the print head across the surface of the article, along a projected straight line, which is known as the scanning path or direction. For each location on the surface of the article and position of the print head, each nozzle of the print head has an associated set of values, a control signal or waveform, that dictates whether or not the nozzle will eject ink and, if so, precisely the amount ink that will be ejected. The control signals correspond to the printed pixels required to produce the desired image on the curved surface of the article.

By controlling the position of the end of the arm, the position (location and orientation) of the print head is controlled relative to the surface of the article to be printed. Various methods may be used to determine the actual position of the print head relative to the surface of the article. Knowing the actual position of the print head, various methods may be used to control the generation of firing pulses for the nozzles at each actual position relative to the article. These include determining the firing pulses based on: a relative distance the print head has moved along the scanning path, such as the distance from the start of the scanning pass, in combination with image data defined or inferred with respect to the scanning path; a knowledge of when printing started, in combination with the image for replication and real-time knowledge of the print head travel speed; absolute coordinates of the print head in combination with predefined image data related to those same coordinates; and sensing a part feature, with a laser or other sensor, and triggering pulses based on the absolute or relative location of the features.

Accordingly, in one aspect of the, an apparatus is provided for printing an image onto a curved surface of a three dimensional article, the apparatus comprising: a support fixture adapted to support the article; an ink jet print head having a plurality of nozzles coupled to a source of printing medium; one of the support fixture supporting the article and the print head being mounted to and carried by the robotic arm; the robotic arm having more than three degrees of freedom of movement and being moveable so as to cause relative movement of the print head along a series of scanning paths following the surface contour of the curved surface of the article; and a controller coupled to the robotic arm and being configured to cause articulation of the robotic arm so as to move the print head along the series of scanning paths, the controller causing the robotic arm to continuously locate the print head relative to the curved surface of the article in a position suitable for printing as the print head is moved along the series of scanning paths, the controller coupled to the print head and further configured to cause the plurality of nozzles to eject printing medium at predetermined locations along the scanning paths so as to form the image on the curved surface of the substrate.

In another aspect of the invention, the scanning paths are linear.

In a further aspect of the invention, the plurality of nozzles is provided in an array.

In an additional aspect of the invention, the plurality of nozzles is provided in a linear array.

In yet another aspect of the invention, the plurality of nozzles is provided in a two dimensional array.

In another aspect of the invention, the controller is configured to cause the plurality of nozzles to eject printing medium based on a distance from a known point on the scanning paths correlated to image location data stored in memory of the controller.

In a further aspect of the invention, the controller is configured to receive from the robotic arm a start signal at a starting point of travel along the scanning paths and additional distance signals at additional distances along the scanning path and relative to the starting point.

In an additional aspect of the invention, during the printing of the image, the sensor is configured to sense an actual scanning path, the controller is configured to correct errors based on the actual scanning path relative to a desired scanning path which is based on a stored image data, the controlling of the ejection of printing medium from the plurality of nozzles being corrected to correspond to the actual scanning path.

In still another aspect of the invention, a sensor is configured to sense part features on the curved surface of the part, wherein the controller is configured to cause the plurality of nozzles to eject printing medium based on the sensing of part features by the sensor.

In another aspect of the invention, the sensor is an optical sensor.

In yet a further aspect of the invention, the sensor is a laser sensor.

In an additional aspect of the invention the controller is configured to have stored in memory a set of values for the ejection of printing medium from each of the plurality of nozzles, the sets of values corresponding to each location of the part features.

In another aspect of the invention, the controller is configured to compare an actual position of the print head to stored image data corresponding to a three dimensional image on the surface of the article and control the ejection of printing medium from the plurality of nozzles based thereon.

In a further aspect of the invention, a print head height sensor is configured to monitor the height of the print head relative to the curved surface of the article.

In an additional aspect of the invention, an actuator is configured to move the print head to a distance from the curved surface of the article based on the monitored height of the print head.

In a still another aspect of the invention, the print head height sensor includes a laser.

In a further aspect of the invention, the controller is configured to cause articulation of the robotic arm to position the print head at an orientation normal to the curved surface of the article.

In an additional aspect of the invention, a method is provided for printing an image onto a curved surface of a three dimensional article, the method comprising the steps of: providing a three dimensional article having a curved surface to be printed upon; locating an ink jet print head having a plurality of nozzles proximate to the surface of the article; moving the ink jet print head along a scanning path across the surface of the article while positioning the ink jet print head relative to curvature exhibited by the surface of the article; and ejecting ink from the plurality of nozzles according to the position of the print head relative to the article and image data stored in memory of a controller and correlated to the surface of the article.

In another aspect of the invention, the step of ejecting ink further comprising the step determining a starting location for moving of the ink jet print head and ejecting ink from the ink jet print head based on distance from the starting point that the print head has moved along the scanning path.

In a still further aspect of the invention, the step of ejecting ink further comprising the step of determining a time of initial ejection of ink and further ejecting ink from the ink jet print head based on elapsed time from the starting of ejecting of ink and the velocity of the print head moving along the scanning path.

In an additional aspect of the invention, the step of ejecting ink further comprises the step of determining absolute coordinates of the print head relative to the surface of the article and correlating the coordinates with image data stored in memory of a controller.

In yet another aspect of the invention, the step of ejecting ink further comprises the step of sensing a part feature with a sensor and ejecting ink from the ink jet print head based on location of the sensed part features correlated with image data stored in memory of a controller.

In a further aspect of the invention, a step is provided for sensing the height of the print head relative to the actual surface of the article and adjusting the height of the print head to an off-set height relative to the actual surface of the article.

BRIEF DESCRIPTION OF THE DRAWINGS

The drawings described herein are for illustration purposes only and are not intended to limit the scope of the present invention in any way.

DETAILED DESCRIPTION

Figure 1:
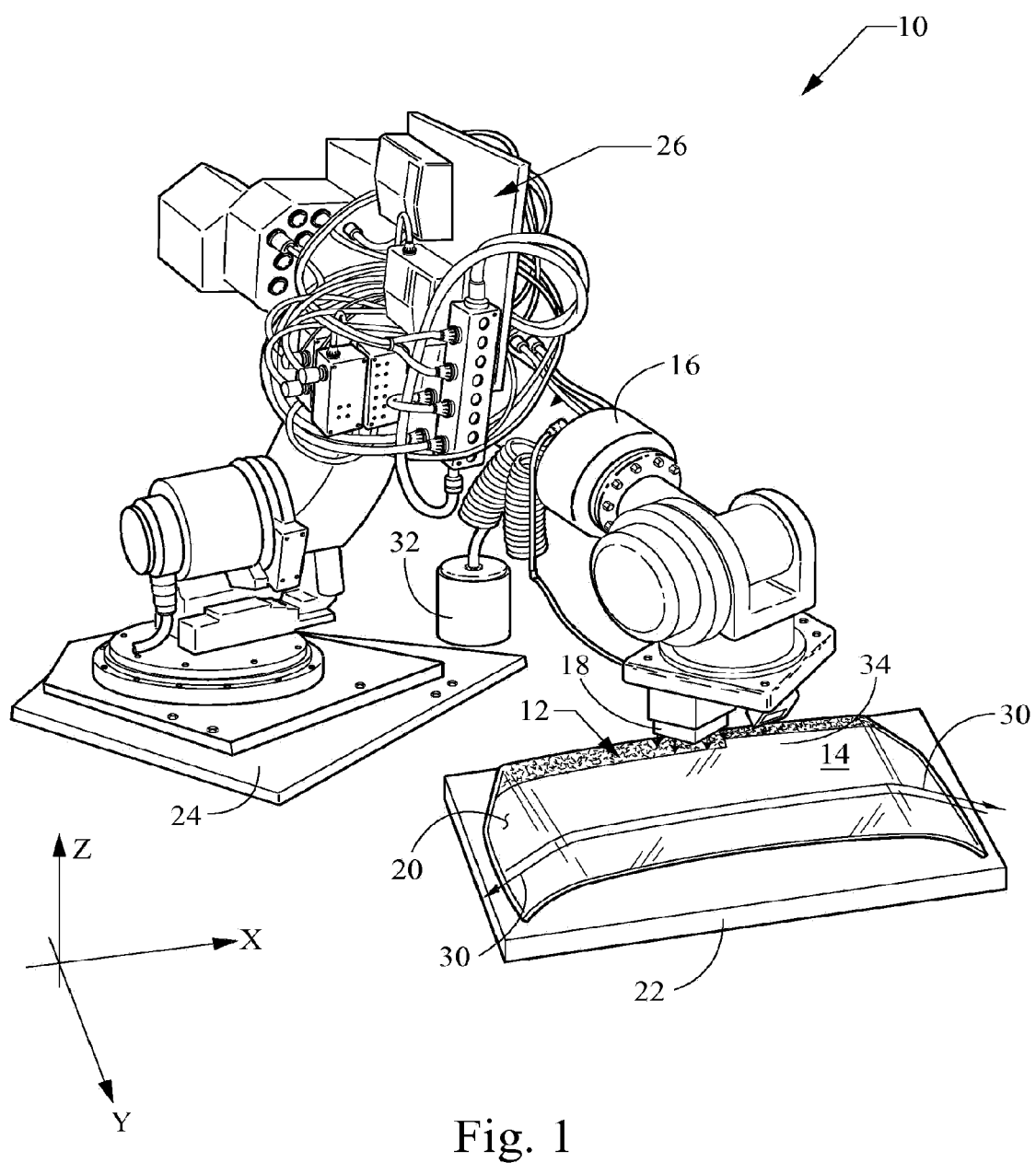
FIG. 1 is a perspective view of a robotic arm traversing an ink jet print head over a three dimensional article and embodying the principles of the present invention.

The following description is merely exemplary in nature and is in no way intended to limit the present invention or its application or uses. It should be understood that throughout the description and drawings, corresponding reference numerals indicate like or corresponding parts and features.

The present invention generally provides a method of printing on the curved surface of a three-dimensional (3-D) article. More specifically, this invention provides a method of printing a high quality image on to a curved surface of the 3-D article using an ink jet print head in conjunction with a robotic arm having more than three degrees of freedom of movement.

Referring now to FIG. 1, as shown therein, a robotic system 10 is configured to print an image 12 upon a 3-D article 14, which is illustrated as a plastic, rear window assembly (backlight) for an automotive vehicle. Plastic automotive window assemblies are generally constructed from a rigid, transparent substrate, over which are applied one or more protective coatings.

The substrate itself may be formed of any thermoplastic polymeric resin or a mixture or combination thereof. Appropriate thermoplastic resins include, but are not limited to, polycarbonate resins, acrylic resins, polyarylate resins, polyester resins, and polysulfone resins, as well as copolymers and mixtures thereof. The substrates may be formed into the desired shape through the use of any one of various known techniques, such as molding, thermoforming, or extrusion.

The protective coatings are designed and selected to protect the article 14 from natural occurrences, such as exposure to ultraviolet radiation, oxidation, and abrasion. This may be achieved through the use of a single protective coating or multiple protective coatings, on one or both sides (exterior and interior sides) of the substrate. In practice, the protective coatings may be a plastic film, an organic coating, an inorganic coating, or a mixture thereof. The plastic film may be of the same or a different composition from substrate. The film and coatings may include ultraviolet absorber (UVA) molecules, rheology control additives, such as dispersants, surfactants, and transparent fillers (e.g., silica, aluminum oxide, etc.) to enhance abrasion resistance, as well as other additives to modify optical, chemical, or physical properties of the resulting article 14. The protective coatings may be applied by any suitable technique known to those skilled in the art. These techniques include deposition from reactive species, such as those employed in vacuum-assisted deposition processes, and atmospheric coating processes, such as those used to apply sol-gel coatings to substrates. Examples of vacuum-assisted deposition processes, include, but are not limited to, plasma enhanced chemical vapor deposition, ion assisted plasma deposition, magnetron sputtering, electron beam evaporation, and ion beam sputtering. Examples of atmospheric coating processes include but are not limited to curtain coating, spray coating, spin coating, dip coating, and flow coating.

The image 12 may be any desired image, such as a black-out or fade-out border, a logo or regulatory markings, and may be printed before or after the application of the protective coatings to the substrate. Thus, the image 12 may be printed directly on the surface of the substrate and encapsulated by the protective coating(s). Alternately, the image may be printed on a surface defined by any one of the protective coatings, including the outer most one of the coatings.

The image 12 is formed from an opaque ink that is formulated for use with ink jet printing, and in particular, the print head utilized with the system 10. One skilled in the art will recognize that the type of ink and the ink parameters, including, but not limited to, percent solids, particle distribution, rheological properties, and cure characteristics, need to be selected to match the operating parameters associated with the print head, such as nozzle orifice size, operating temperature and pressure. Additionally, the ink must be compatible (both in terms of adhesion to and non-degradation thereof) with the materials forming the substrate and the protective coating(s).

The robotic system 10 includes a robotic arm 16 that is moveable with more than three degrees of freedom, preferably six, so that the end of the robotic arm 16, to which is mounted an ink jet print head 18, is capable of being located in any position (location and orientation) relative to a curved surface 20 of the article 14, when the article 14 is positioned in a stationary support fixture 22 that securely holds the article 14. As such, the tool center point (TCP) defined by the print head 18 on the end of the robotic arm 16 can be moved translationally to any point in the X, Y and Z coordinate system and oriented rotationally about any of the rotational axes at Rx, Ry and Rz, where Rx, Ry, Rz indicate the orientation components of the six degrees of freedom location (it is noted that as used herein this is general terminology and these rotational axes are often referred to by different nomenclature, including for example A, B, C, depending on the source), and the latter of which defines an axis being normal to the print plane 36 (shown in FIG. 4) defined by the print head 18, as discussed further below. In this manner, the location and orientation of the TCP can kept both a specified distance from and normal to the surface 20 of the article 14 at all times as the print head 18 is scanned (moved along a scanning path) across the surface 20 during the printing process.

Figure 2A:
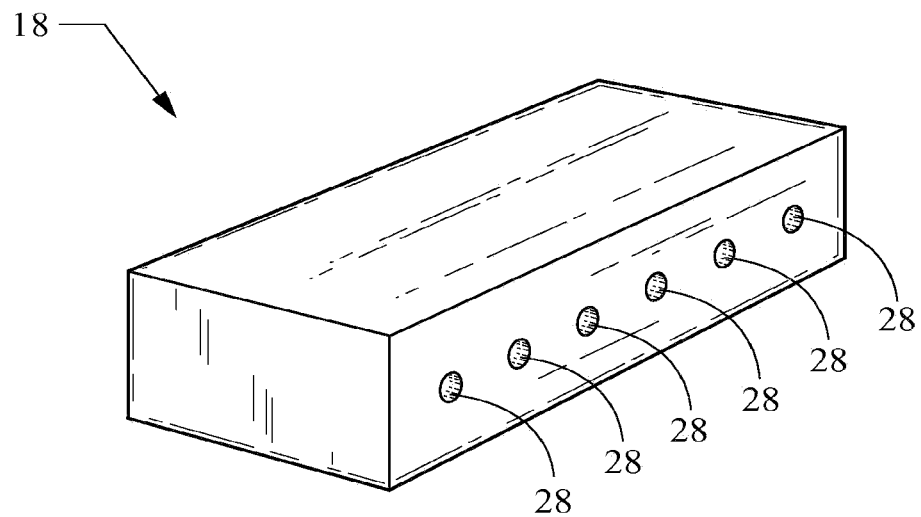
FIG. 2A and FIG. 2B are representational perspective views of the underside of ink jet print heads exhibiting linear and two dimensional arrays, respectively, of nozzles located thereon.
Figure 2B:
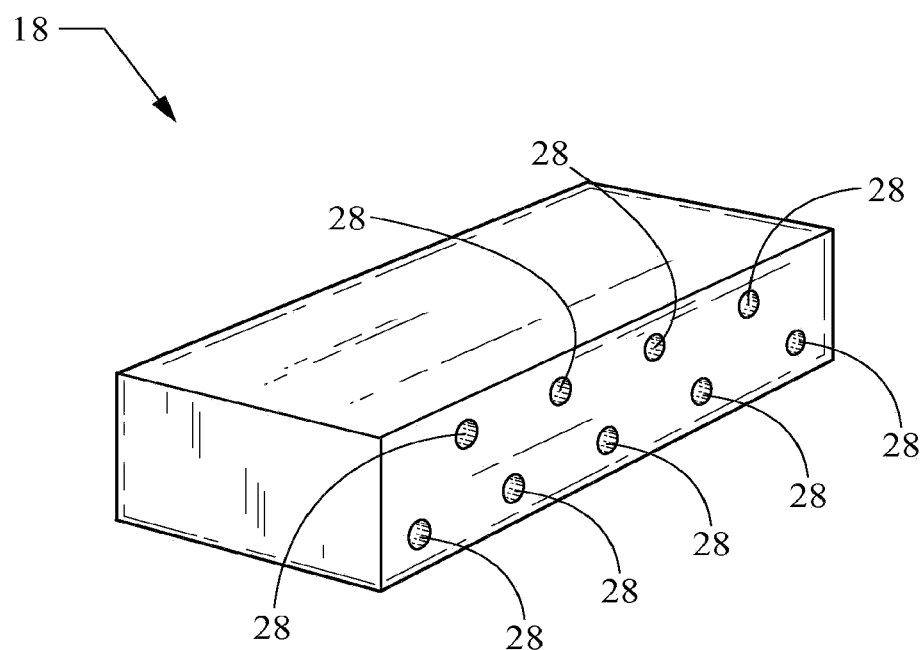

The robotic system 10 is stationarily mounted to a support surface 24 and, as noted above, includes the print head 18 attached to the end of the robot arm 16. The print head 18 is constructed as is commonly known by those skilled in the art and configured to print on the surface 20 of the 3-D article 14. In order to eject ink, the print head 18 includes a series of nozzles 28 positioned in a linear array, as seen in FIG. 2A, a two-dimensional array, as seen in FIG. 2B, or another configuration as appropriate for the specific printing application.

Figure 3:
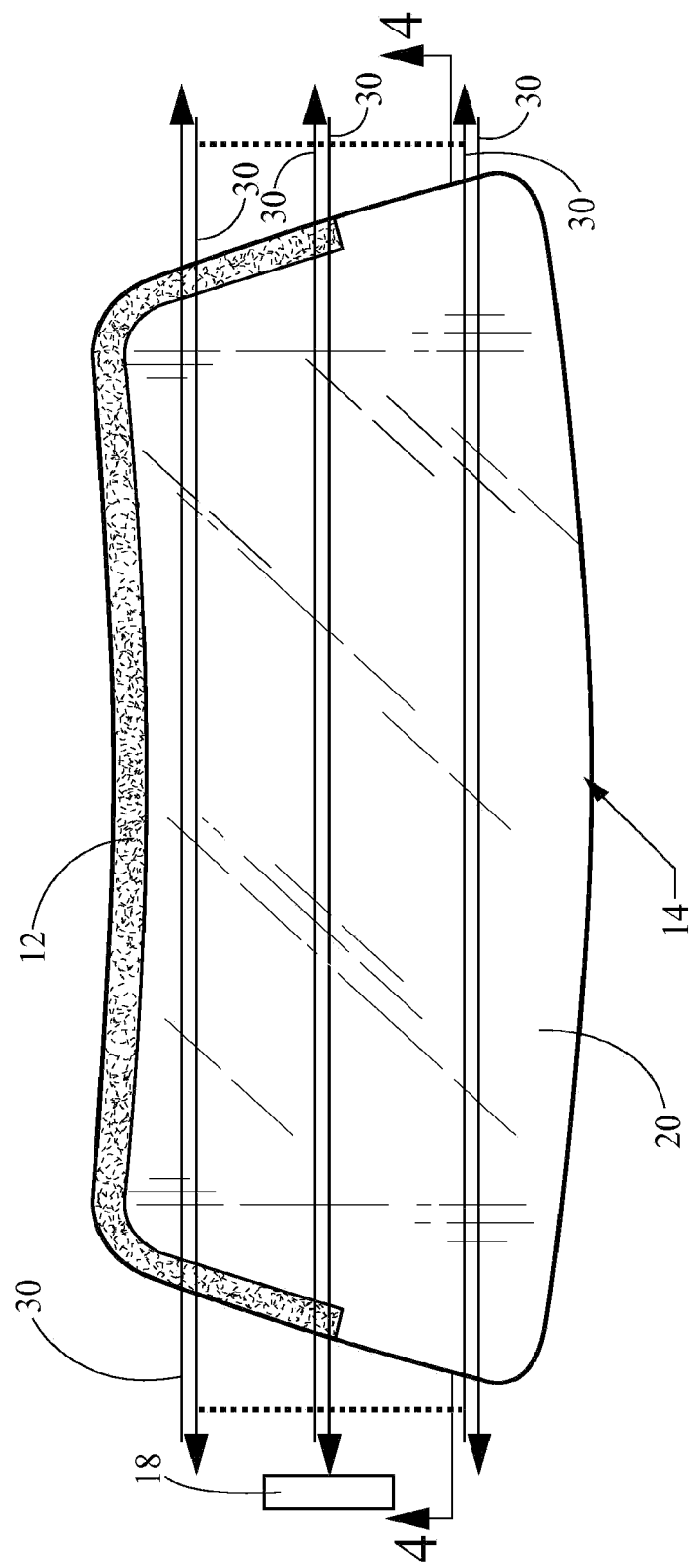
FIG. 3 is a plan view of a three dimensional article showing the linear projection of scanning paths of an ink jet print head and with an image partially printed thereon.
Figure 4:
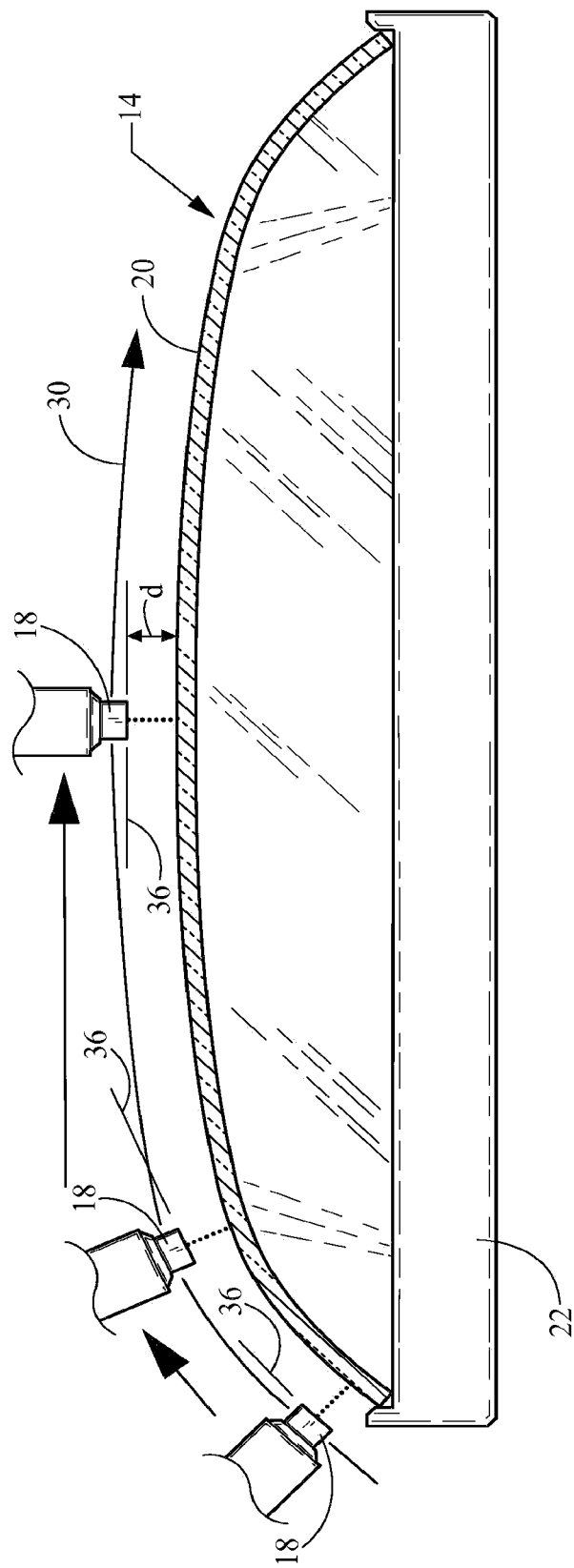
FIG. 4 is sectional view, generally taken along line 4-4 in FIG. 3, of an ink jet print head following a scanning path and printing an image in accordance with the principles of the present invention.

During printing, a controller 26 controls movement of the robotic arm 16 and moves the print head 18 through a series of scanning paths or passes, which are generally designated at 30 in FIGS. 1,3 and 4. The scanning paths 30 are such that the print head 18 follows the contour of the surface 20 of the article 14 as it progresses across the article 14, at a defined off-set distance (d) that is suitable for the particular printing application. While the scanning paths 30 do follow the contour of the surface 20 of the article 14, the scanning paths 30 are in a direction such that they define a series of parallel, linear projections onto the article 14. This is readily seen in the plan view of FIG. 3. Generally, the robotic arm 16 will start with the print head 18 at one end of the article 14 and proceed through each successive scanning pass 30 until reaching the opposing end of the article.

All points on the surface 20 of the article 14 are considered to define a pixel that represents a set of values for controlling the ejection of ink from the nozzles 28, in accordance with the application of the image 12 onto the surface 20 of the article 14. Thus, for each pixel location, a set of values stored in memory of the controller 26, determines whether a given nozzle 28 on the print heat 18 will eject ink so as to print a pixel of the image 12 at that location. As the print head 18 is moved through each scanning pass 30, for each pixel location, each nozzle 28 of the print head 18 either ejects ink in a prescribed manner (i.e. a particular amount, etc.) or ejects no ink. By associating a set of values with each pixel location, the image 12 is printed in the appropriate area on the article 14. As seen in FIGS. 1 and 3, the image 12 is a black-out feature being provided around the border of the article 14.

As noted above, the controller 26 is electrically coupled to the robotic arm 16 and controls movement of the arm 16, and therefore the print head 18. The same controller 26, or an additional controller, controls the print head 18 and the ejection of ink from the nozzles according to the set of values represented by the pixel location on the article 14 that corresponds with the position of the print head 18 and the TCP. Accordingly, the controller 26 controls the necessary mechanisms or structures commonly associated with an ink jet print head 18, including any flow regulator(s) associated with the nozzles 28 and fluidly coupling a printing medium (ink) source 32 to the nozzles 28. The various structures associated with ink jet print heads 18 are well known to those skilled in the art and are therefore need not be discussed in further detail herein.

When forming an article 14, CAD information can be used to define the ideal shape of the article 14. However, because of the various processes that the article 14 undergoes during manufacturing, the actual shape of the article 14 will differ slightly from the ideal shape of the article 14. This must be taken into account in order to produce a high quality image 12 on the article 14. To produce the image 12, a waveform with a particular shape, amplitude and pulse duration must be applied to each nozzle 28 at a very precise time, that time corresponding with the coinciding of the TCP with a pixel location on the actual surface 20 of the article 14 and the associated set of values for that pixel location To ensure proper offset (d) of the print head 18 from the surface 20 of the article 14, the system 10 may employ an active height control mechanism, as is described in U.S. patent application Ser. No. 11/321,567, which is herein incorporated in its entirety by reference. Generally, with such a height control mechanism, a sensor 34, (such as a triangulation laser, photonic sensor, air pressure sensor, ultrasonic sensor, magnetic sensor, etc.) directly or indirectly measures the distance of a plane 36, defined by the nozzles 28 of the print head 18, from the surface 20 of the article 14. As a result this measurement, the controller 26 corrects the position of the robotic arm 16 so as to move the print head 18 to the desired off-set distance (d) from the surface 20 of the article 14. Alternately, the position of the print head 18, and therefore the nozzles 28, can be actively controlled, based on input from the sensor 34, through use of an actuator associated with the print head 18 on the end of the robotic arm 16. Such an actuator moves the print head 18 and nozzles 28 (either toward or away from the surface 20) to predetermined off-set distance (d), as prescribed by the particular application, along the axis normal to the nozzle plane 36. The actuator may any one of a variety of devices capable of quick response and high precision, such as linear motors and electric, hydraulic, pneumatic, piezoelectric, electromagnetic, or other actuators.

As previously noted, various methods may be used to determine the actual position of the print head 18 relative to the actual surface 20 of the article 14. Knowing the actual position of the print head 18, various methods may be used to control the generation of firing pulses (the previously mentioned sets of values for each nozzles at a given pixel location) for the nozzles 28 at each actual position of the surface 20 of the article 14. The various methods described herein include determining the firing pulses based on: a relative distance the print head 18 has moved along the a scanning path 30, such as the distance from the start of the scanning path 30, in combination with image data defined or inferred with respect to the scanning path 30; a knowledge of when printing started during a scanning pass along a scanning path 30, in combination with the image for replication and real-time knowledge of the print head travel speed; absolute coordinates of the print head 18 in combination with predefined image data related to those same coordinates; and sensing a feature on the surface 20 of the article 14, with a laser or other sensor, and triggering pulses based on the absolute or relative location of the features.

In the first of the above methods, namely determining the firing pulses based on a relative distance from the start of the scanning pass 30, the starting point of at least the first scanning path 30, and possibly each subsequent scanning path 30, is determined relative to the location of the article 14 in the support fixture 22. A signal is outputted at the start of movement of the print head 18 by the robotic arm 16 along the scanning path 30. From the start signal, a distance signal is continuously outputted marking the position of the print head 18 along the scanning path 30. These distances are correlated to image data stored in the memory of the controller 26 and the appropriate nozzles 28 are triggered by the values sets associated with the pixel location on the surface 20 of the article 14 that corresponds with the distance the print head 18 has moved along the scanning path 30. Preferably, the print head 18 initially accelerates and has achieved a constant velocity before the print head 18 reaches the first pixel location requiring printing on the article 14. If pixel locations requiring printing are encountered while the print head 18 is undergoing acceleration, the values sets and firing pulses of the nozzles 28 are correlated to the then acceleration of the print head 18 such that proper locating of the printed pixels on the surface of the article 14 is achieved. Approximate positioning of the start of the scanning path can be compensated for through various means. One such means being extending the print head 18 along the scanning paths 30 without printing on the surface 20 of the article 14, while logging real positional data, and then applying calibration filtering algorithms to the real positional data so as to compensate for the approximate positioning of the scanning paths 30 relative to the surface 20 of the article 14.

In a somewhat similar method, instead of outputting a start signal at the start of the scanning path 30, the start signal could be outputted at the first pixel location on the surface 20 of the article 14 requiring printing. This, in conjunction with image data stored in memory, allows for calculation of when subsequent pixel locations requiring print are encountered relative to the print starting location and to the speed of travel of the print head 18 along the scanning path, which preferably is a constant velocity.

In another of the above methods, the firing pulses (value sets for a given pixel location on the surface 20 of the article 14) are based on absolute coordinates of the print head 18. These coordinates are determined relative to the actual surface 20 of the article 14 via one or more sensors and correlated to pixel locations on the actual surface 20 of the article 14. The coordinates, in combination with predefined image data stored in memory of the controller 26 and related to those same coordinates, are then used to appropriately cause ejection of ink from the nozzles 28 for each pixel location.

Finally, the firing pulses may be determined based on sensing a feature formed on the surface 20 of the article 14. As such a molded in feature or series of features, which may be a perimeter frame or other indicia on the surface 20 of the article 20, are sensed with a laser or other sensor. The sensed feature or series of features is then compared to feature data stored in memory of the controller 26 and correlated with a set of values corresponding to a pixel location associated with the feature or features. Firing pulses are thus triggered based on the absolute or relative location of the sensed features on the surface 20 of the article 14.

As an alternative to the above, the robotic arm 16 may be coupled to and carry a support fixture 22 supporting the article. As such, the robotic arm 16 causes movement of the article 14 as opposed to movement of the print head 18, which in this alternative embodiment would be stationary. However, relative movement of the print head 18 with respect to the surface 20 of the article 14 would still occur as described above.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. An apparatus for printing an image onto a curved surface of a three dimensional article, the apparatus comprising:
   a support fixture adapted to support the article;
   an ink jet print head having a plurality of nozzles coupled to a source of printing medium;
   an articulatable robotic arm, one of the print head and the support fixture being mounted to and carried by the robotic arm, the robotic arm having more than three degrees of freedom of movement and being moveable so as to cause relative movement of the print head along a series of scanning paths following surface contour of the curved surface of the article;
   a controller coupled to the robotic arm and being configured to cause articulation of the robotic arm so as to cause relative movement of the print head along the series of scanning paths, the controller causing the robotic arm to continuously locate the print head in a position suitable for printing as the print head is moved along the series of scanning paths, the controller coupled to the print head and further configured to cause the plurality of nozzles to eject printing medium at predetermined pixel locations along the scanning paths so as to form the image on the curved surface of the substrate, wherein the surface is defined by a plurality of pixels; and
   a sensor configured to sense part features on the curved surface of the part and transmit a feature signal to the controller, wherein the controller is configured to change the position of the plurality of nozzles to the position suitable for printing based at least in part on the feature signal;
   wherein the controller is configured to receive a start signal at a starting point of travel along the scanning paths and a plurality of distance signals at additional distances along the scanning path and relative to the starting point, the starting point being the location of a predetermined first pixel of the plurality of pixels, wherein the controller is configured to position the plurality of nozzles at the suitable position for printing at each of the plurality of distances along the scanning path; and
   wherein the controller is configured to selectively control the ejection of printing medium from the plurality of nozzles in response to at each of the plurality of distance signals and to the plurality of nozzles being disposed at the suitable position for printing.

2. The apparatus of claim 1 wherein the scanning paths are linear.

3. The apparatus of claim 1 wherein the plurality of nozzles are provided in one of a linear array and a two-dimensional array.

4. The apparatus of claim 1 wherein the controller is configured to cause the plurality of nozzles to eject printing medium based on a distance from a known point on the scanning paths correlated to image location data stored in memory of the controller.

5. The apparatus of claim 1 where in the sensor is an optical sensor.

6. The apparatus of claim 1 wherein the sensor is a laser sensor.

7. The apparatus of claim 1 wherein the controller is configured to have stored in memory a set of values for the ejection of printing medium from each of the plurality of nozzles, the sets of values corresponding to each location of the part features.

8. The apparatus of claim 1 wherein the controller is configured to compare an actual position of the print head to the stored image data corresponding to a three dimensional image on the surface of the article and control the ejection of printing medium from the plurality of nozzles based thereon.

9. The apparatus of claim 1 further comprising a print head height sensor configured to monitor the height of the print head relative to the curved surface of the article.

10. The apparatus of claim 9 further comprising an actuator configured to move one of the print head and surface of the article either toward or away from one another based on the monitored height of the print head.

11. The apparatus of claim 9 wherein the print head height sensor includes a laser.

12. The apparatus of claim 1, wherein the controller is configured to cause ejection of the printing medium based upon a set of values stored in memory of the controller, and wherein the controller is configured to control whether a given nozzle ejects printing medium.

13. The apparatus of claim 1, wherein the controller is configured to control the plurality of nozzles such that each nozzle of the print head either ejects printing medium or ejects no printing medium.

14. The apparatus of claim 1, wherein the article is a plastic automotive window.

15. The apparatus of claim 1, wherein the article is rotationally asymmetric.

16. The apparatus of claim 1 wherein the controller is configured to arrange the print head in an orientation normal relative to the curved surface of the article when in the position suitable for printing.

17. The apparatus of claim 1 wherein the robotic arm is further configured to move the print head at a constant velocity as the print head is moved along the series of scanning paths.

18. An apparatus for printing an image onto a curved surface of a three dimensional article, the apparatus comprising:
a support fixture adapted to support the article;
an ink jet print head having a plurality of nozzles coupled to a source of printing medium;
an articulatable robotic arm, one of the print head and the support fixture being mounted to and carried by the robotic arm, the robotic arm having more than three degrees of freedom of movement and being moveable so as to cause relative movement of the print head along a series of scanning paths at a constant velocity while following surface contour of the curved surface of the article;
a controller coupled to the robotic arm and being configured to cause articulation of the robotic arm so as to cause relative movement of the print head along the series of scanning paths, the controller causing the robotic arm to continuously locate the print head in a position suitable for printing as the print head is moved along the series of scanning paths, the controller being configured to receive a start signal at a first position along each of the series of scanning paths and a plurality of position signals at along the series of scanning paths, the controller coupled to the print head and further configured to cause the plurality of nozzles to eject printing medium at predetermined pixel locations along the scanning paths so as to form the image on the curved surface of the substrate, wherein the surface is defined by a plurality of pixels; and
a sensor configured to sense part features on the curved surface of the part and transmit a feature signal to the controller, wherein the controller is configured to change the position of the plurality of nozzles to the position suitable for printing and eject printing medium based on the feature signal,
wherein the controller is configured to selectively control the ejection of printing medium from the plurality of nozzles based at least in part on the plurality of distance signals, a stored image data and in response to the plurality of nozzles being disposed at the suitable position for printing.

19. The apparatus of claim 18 wherein the controller is configured to receive a start signal at a starting point of travel along the scanning paths and additional distance signals at additional distances along the scanning path and relative to the starting point.

20. The apparatus of claim 18 wherein the controller is configured to arrange the print head in an orientation normal relative to the curved surface of the article when in the position suitable for printing.

* * * * *